(12) United States Patent
Caruel et al.

(10) Patent No.: US 12,264,625 B2
(45) Date of Patent: Apr. 1, 2025

(54) ACOUSTIC ATTENUATION PANEL AND ITS MANUFACTURING METHODS

(71) Applicant: Safran Nacelles, Gonfreville l'Orcher (FR)

(72) Inventors: Pierre Caruel, Moissy Cramayel (FR); Bertrand Desjoyeaux, Moissy Cramayel (FR); Bertrand Leroyer, Moissy Cramayel (FR); Marc Versaevel, Moissy Cramayel (FR); Laurent Georges Valleroy, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 241 days.

(21) Appl. No.: 17/729,541

(22) Filed: Apr. 26, 2022

(65) Prior Publication Data

US 2022/0250767 A1    Aug. 11, 2022

Related U.S. Application Data

(63) Continuation of application No. PCT/FR2020/051947, filed on Oct. 28, 2020.

(30) Foreign Application Priority Data

Oct. 31, 2019  (FR) ..................................... 19/12265

(51) Int. Cl.
*F02C 7/045* (2006.01)
*B32B 3/12* (2006.01)
*B32B 3/26* (2006.01)

(52) U.S. Cl.
CPC ................ *F02C 7/045* (2013.01); *B32B 3/12* (2013.01); *B32B 3/266* (2013.01)

(58) Field of Classification Search
CPC ............ B32B 3/12; B32B 3/266; F02C 7/045
See application file for complete search history.

(56) References Cited

U.S. PATENT DOCUMENTS

| | | | | |
|---|---|---|---|---|
| 3,887,031 A * | 6/1975 | Wirt | ...................... | G10K 11/172 181/292 |
| 5,000,998 A * | 3/1991 | Bendig | ...................... | B64C 1/38 156/154 |
| 5,310,592 A * | 5/1994 | Baker | .................. | H10N 60/203 244/113 |
| 6,609,592 B2 * | 8/2003 | Wilson | ................. | B23K 26/389 181/292 |
| 7,484,592 B2 * | 2/2009 | Porte | .................... | G10K 11/168 181/290 |

(Continued)

OTHER PUBLICATIONS

International Search Report for corresponding International Application PCT/FR2020/051947, mailed Feb. 11, 2021.

*Primary Examiner* — Jeremy A Luks
(74) *Attorney, Agent, or Firm* — Burris Law, PLLC

(57) ABSTRACT

An acoustic attenuation panel includes a cellular structure including a plurality of acoustic cells separated from one another by peripheral partitions, a perforated acoustic structure, the perforated acoustic structure and the cellular structure being formed in one piece in a first material, and a porous acoustic layer formed of a second material and fastened to a surface of the perforated acoustic structure by entangling the first material and the second material.

18 Claims, 3 Drawing Sheets

(56) References Cited

U.S. PATENT DOCUMENTS

| | | | |
|---|---|---|---|
| 7,921,966 B2* | 4/2011 | Chiou | G10K 11/168 |
| | | | 181/292 |
| 11,434,819 B2* | 9/2022 | Murugappan | F04D 29/664 |
| 2015/0044413 A1 | 2/2015 | Vauchel et al. | |
| 2018/0114516 A1 | 4/2018 | Hakuta et al. | |
| 2018/0162542 A1 | 6/2018 | VanDeMark et al. | |
| 2018/0257196 A1* | 9/2018 | Simpson | B32B 15/14 |
| 2019/0251943 A1* | 8/2019 | Thomas | B32B 1/00 |
| 2019/0264614 A1 | 8/2019 | Versaevel et al. | |
| 2021/0190007 A1* | 6/2021 | Lauder | F02C 7/24 |
| 2021/0193100 A1* | 6/2021 | Froning | C09J 7/35 |

\* cited by examiner

ACOUSTIC ATTENUATION PANEL AND ITS MANUFACTURING METHODS

CROSS-REFERENCE TO RELATED APPLICATIONS

This application is a continuation of International Application No. PCT/FR2020/051947, filed on Oct. 28, 2020, which claims priority to and the benefit of FR 19/12265, filed on Oct. 31, 2019. The disclosures of the above applications are incorporated herein by reference.

FIELD

The present disclosure relates to an acoustic attenuation panel intended to absorb the sound energy generated in particular by aircraft turbomachines such as a turbojet engine or an aircraft turboprop.

BACKGROUND

The statements in this section merely provide background information related to the present disclosure and may not constitute prior art.

An aircraft is propelled by one or more propulsion units each comprising a turbojet engine/turboprop housed in a tubular nacelle. Each propulsion unit is attached to the aircraft by a mast generally located under a wing or at a fuselage level.

A nacelle generally has a structure comprising an upstream section forming an air inlet upstream of the engine, a middle section intended to surround a fan of the turbojet engine, and a downstream section capable of accommodating thrust reversal means and intended to surround the combustion chamber of the turbojet engine and is generally terminated by an exhaust nozzle whose outlet is located downstream of the turbojet engine.

The air inlet is used to optimize the capture of air necessary to supply the fan of the turbojet engine throughout the flight envelope and to channel the air towards the fan.

The air inlet mainly comprises an air inlet lip forming a leading edge, attached to an annular structure.

The annular structure comprises an outer fairing ensuring the external aerodynamic continuity of the nacelle and an internal fairing ensuring the internal aerodynamic continuity of the nacelle, in particular with the external casing of the fan at the level of the middle section. The air inlet lip ensures the upstream junction between these two fairings.

The internal fairing of the air inlet is exposed to a high flow of air and is located close to the blades of the fan. It therefore contributes to the transmission of noise originating from the turbojet engine to the outside of the aircraft.

Also, it is known from the prior art to equip the internal fairing of the air inlet of the nacelle with an acoustic panel in order to attenuate the transmission of the noise generated by the turbojet engine.

Typically, the acoustic panel includes a perforated acoustic structure and a honeycomb type cellular structure which is assembled in particular by bonding to the perforated acoustic structure.

The cellular structure includes a plurality of acoustic cells, forming Helmholtz resonators or quarter-wave resonators, which are separated from each other by peripheral partitions.

The perforated acoustic structure is turned towards the noise emission zone, so that the acoustic waves can penetrate through the openings of the perforated acoustic structure inside the acoustic cells. The acoustic energy is dissipated by visco-thermal effect in these perforations.

The cellular structure of the acoustic panel may include a single thickness of cells, or two thicknesses separated by a micro-perforated septum to improve the acoustic performance of the panel, in particular the width of the band of absorbed frequencies.

A disadvantage of these types of panels lies in the fact that the perforated acoustic structure has a strong acoustic non-linearity which causes its surface impedance to vary significantly with the acoustic level and the speed of the grazing flow, in particular because of the interaction between the perforations and the flow of air.

A solution of the prior art consists in adding to the perforated acoustic structure, a porous layer by gluing, acoustically equivalent to perforations of diameter smaller than the perforations of the perforated acoustic structure, reducing the interaction with the flow of air.

Although this solution makes it possible to reduce the acoustic non-linearity, such a structure has the major drawback of an additional assembly, penalizing in terms of manufacturing time and cost. In addition, poor assembly can lead to risks of acoustic inhomogeneity. Finally, there is also a risk of corrosion of the porous layer exposed to the air flow if it is made of metallic material, imposing constraints on the choice of materials.

Another solution is to provide an acoustic attenuation panel formed of two superimposed cellular structures, separated by a porous layer.

However, this type of panel makes the manufacturing method longer and more expensive and introduces risks of acoustic inhomogeneities caused by possible misalignments of the honeycombs resulting in reduced aerodynamic performance.

SUMMARY

This section provides a general summary of the disclosure and is not a comprehensive disclosure of its full scope or all of its features.

The present disclosure, according to a first aspect, relates to an acoustic attenuation panel including:

a cellular structure including a plurality of acoustic cells separated from each other by peripheral partitions, a perforated acoustic structure, the perforated acoustic structure and the cellular structure being formed in a single part in a first material, and a porous acoustic layer formed of a second material, fixed to a surface of the perforated acoustic structure by entanglement of at least one of the materials in a second material.

In other words, the porous acoustic layer formed from the second material is fixed to a surface of the perforated acoustic structure by entanglement of the first material in the second material and/or of the second material in the first material, that is to say the porous acoustic layer is attached to a surface of the perforated acoustic structure by entanglement of the first material and the second material with each other.

Thus, due to the acoustic attenuation panel according to the present disclosure in which the cellular structure and the perforated acoustic structure are formed in a single part and in which the connection between the perforated acoustic structure and the porous layer is obtained by intricacy of their material, the linearity of the panels is improved so that the aerodynamic performance is improved. The panels are robust against bad weather and easier to manufacture.

According to other forms of the present disclosure, the acoustic attenuation panel includes one or more of the following optional features considered alone or in all possible combinations.

The single part formed of the cellular structure and the perforated acoustic structure, and the acoustically porous layer are made of identical materials.

The single part formed of the cellular structure and the perforated acoustic structure, and the acoustically porous layer are made of different materials.

Perforations of the perforated acoustic structure are spaced from each other by a variable distance in an axial direction A.

The perforations of the perforated acoustic structure have an increasing dimension S in an axial direction A.

The perforations of the perforated acoustic structure have a substantially rectangular shape.

In variations of the present disclosure, the perforations of the perforated acoustic structure represent at least 20% of the surface of said structure, at least 40% of the surface of said structure, or at least 60% of the surface of said structure.

The porous acoustic layer has holes of dimensions smaller than the dimensions S of the perforations of the perforated acoustic structure.

The porous acoustic layer has holes of increasing size in the axial direction A.

The porous acoustic layer has a woven architecture comprising interlacings of elementary yarns or fiber rovings.

The yarns or rovings of fibers of the porous acoustic layer are partially linked together at the crossing levels and/or according to edge segments with each other, that is to say that the yarns or rovings of fibers are partially glued together by parallel adjacent parts.

In one form, the perforated acoustic structure and the peripheral partitions have a thickness between 0.5 and 5 millimeters. In another form, the perforated acoustic structure and the peripheral partitions have a thickness from 0.5 to 2 millimeters.

The acoustic attenuation panel comprises a removable cover, arranged on one side of the cellular structure opposite the perforated acoustic structure.

The perforated acoustic structure can be made of polymer material, for example thermoplastic material or thermosetting material such as polyurethane, silicone, or epoxy, composite material with thermoplastic or thermosetting matrix reinforced with short fibers or long fibers such as polyester fibers, polyethylene fibers, glass fibers, carbon fibers, Kevlar® brand para-aramid fibers, synthetic fibers, or metal alloys.

The porous acoustic layer can be made of polymer material comprising, for example, plastic yarns, of composite material comprising, for example, composite yarns such as fibers coated with a thermoplastic or thermosetting matrix, or else of metallic material comprising, for example, metal yarns of light alloys or ferrous alloys.

According to another aspect, the present disclosure relates to an air inlet of a nacelle, arranged upstream of a fan, the air inlet comprising an inner face facing the fan, said inner face receiving at least one acoustic attenuation panel as previously described.

According to another aspect, the present disclosure relates to a method for manufacturing an acoustic attenuation panel as described above by a molding tool comprising at least one mold and one counter-mold, the method comprising the steps of:

Pinching the porous layer between said at least one mold and the counter-mold,

Injecting material intended to form a perforated acoustic structure and a cellular structure in one piece in the molding tool, Entangling the material intended to form a perforated acoustic structure and a cellular structure with the material of the porous layer, and Removing the acoustic attenuation panel formed from the molding tool.

According to other forms of the present disclosure, the method comprises one or more of the following optional features considered alone or in all possible combinations.

Said at least one mold has a shape intended to form an acoustic cell of the cellular structure.

Said at least one mold has at least one punch intended to form a perforation in the perforated acoustic structure.

The surfaces of the punches and the counter-mold are coated with a flexible material such as silicone or fluorocarbon.

The surfaces of the punches and of the counter-mold are made of rigid material.

According to another aspect, the present disclosure relates to a method for manufacturing an acoustic attenuation panel as previously described by a molding tool comprising a mold and a counter-mold, the method comprising:

Making a perforated acoustic structure and a cellular structure formed in a single part by the mold and the counter-mold, Removing the single part from the molding tool, Placing a porous acoustic layer against the perforated acoustic structure of the single part, and Fusing or partially dissolving the single part formed of the perforated acoustic structure and of the cellular structure and/or of the porous layer so as to produce an entanglement of the materials of said single part and of the porous layer.

According to another aspect, the present disclosure relates to a method for additive manufacturing an acoustic attenuation panel as previously described comprising:

Depositing a material intended to form a porous acoustic layer, and

Depositing an additive manufacturing material intended to form a perforated acoustic structure and joining the perforated acoustic structure to the porous acoustic layer, wherein an entanglement between the material of the porous layer and the additive manufacturing material of the perforated acoustic structure is produced at least on the periphery of the perforations of the perforated acoustic structure.

Thus, it is possible to dispense with the molds and counter-mold.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
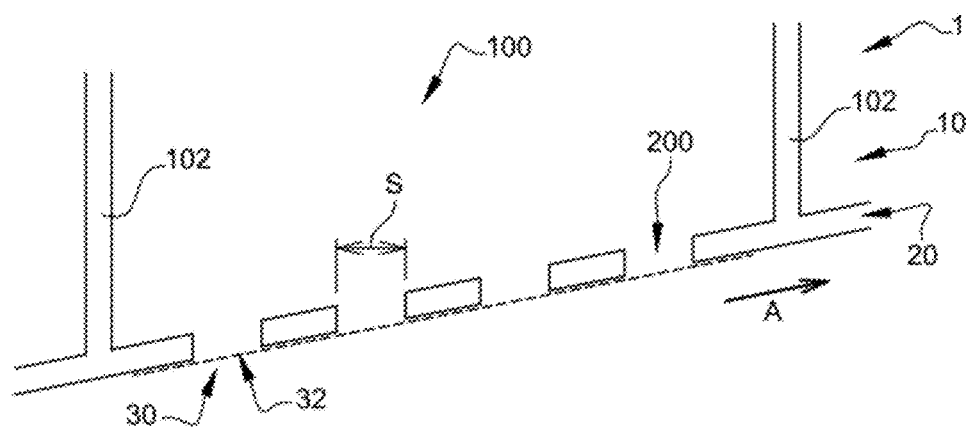
FIG. 1 is a partial cross-sectional view of an acoustic attenuation panel according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 7:
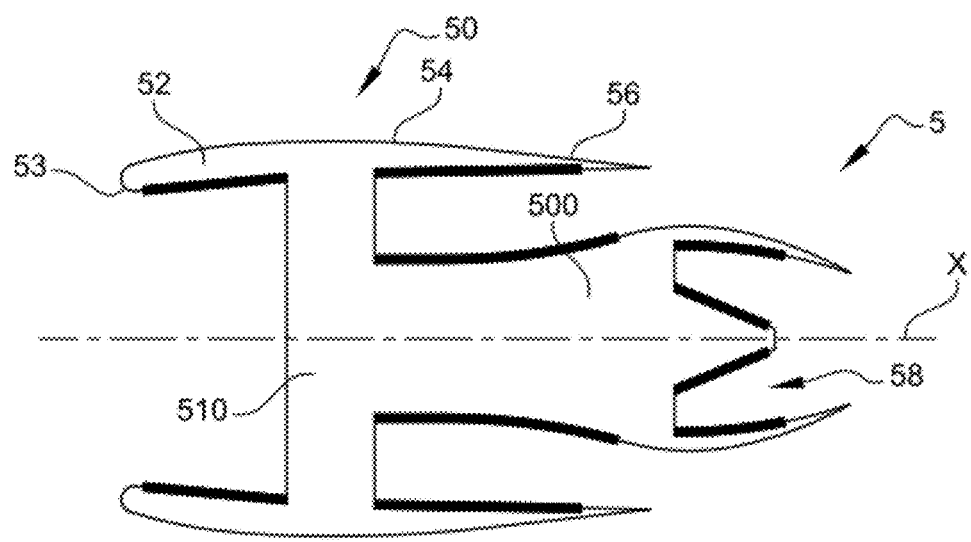
FIG. 7 is an illustration of a propulsion unit comprising a nacelle whose air inlet receives an acoustic attenuation panel according to the present disclosure.

Note that in the description and in the claims, the terms upstream and downstream must be understood in relation to the circulation of the air flow inside the propulsion unit formed by the nacelle and the turbojet engine, that is to say from left to right with reference to FIG. 7.

FIG. 1 is an enlarged cross-sectional view of an acoustic attenuation panel (FIG. 3) according to the present disclosure.

The acoustic panel 1 comprises a cellular structure 10, a perforated acoustic structure 20, and a porous acoustic layer 30 attached to the perforated acoustic structure 20.

Thus, the cellular structure 10 of the acoustic panel according to the present disclosure has a free face and a face provided with a perforated acoustic structure 20 and a porous acoustic layer 30.

The cellular structure 10 and the perforated acoustic structure 20 are formed in a single part, that is to say they are made in one part.

This reduces the risk of erosion, abrasion, detachment, or delamination of the acoustic panels of the prior art in which the two structures are interconnected, for example by gluing or adhesive bonding.

The cellular structure 10 comprises a plurality of acoustic cells 100 which are separated from each other by peripheral partitions 102.

In the present example, each cell has a square shape with a side of 5 centimeters.

Figure 3:
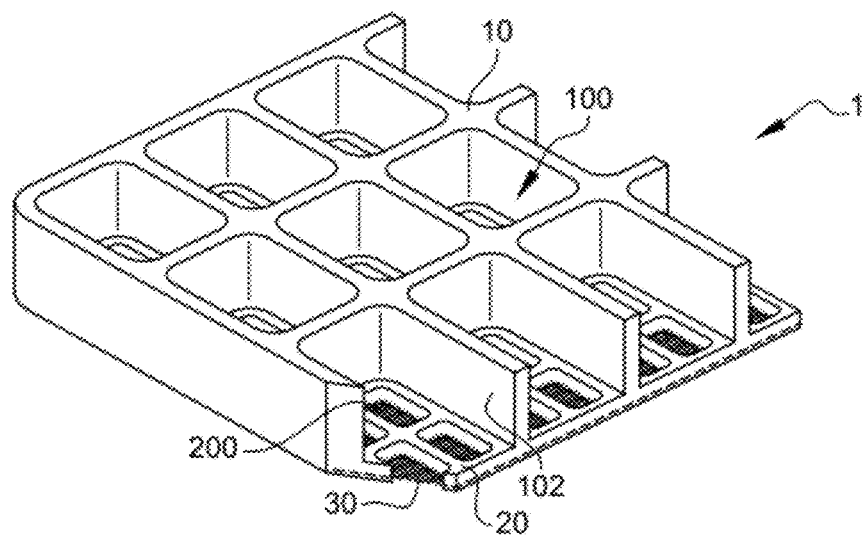
FIG. 3 is a perspective view of the acoustic attenuation panel according to one form of the present disclosure.

In a variant, each cell may have a rectangular shape as illustrated in FIG. 3.

The acoustic cells are not limited to the shapes described above and can have other polygonal shapes such as a triangle, a pentagon, and a hexagon, among others.

Each peripheral partition 102 extends from the perforated acoustic structure 20 at an angle of 90°. In other words, each peripheral partition extends substantially perpendicular to the perforated acoustic structure 20.

These partitions 102 may include projections or tappings (not represented) intended to allow the acoustic attenuation panel to be fixed in a nacelle (FIG. 7). In some forms of the present disclosure, the acoustic panel is intended to be fixed or glued to a duct of the nacelle to provide the functions of aerodynamic surface and acoustic attenuator of this duct of the nacelle. In the case of a fixing, the surface between the panel and the nacelle may present a clearance. As such, provision is made in the acoustic attenuation panel 1 to support a sealing element such as a joint sealing.

In one form, the perforated acoustic structure 20 and the peripheral partitions 102 have a thickness between 0.5 and 5 millimeters. For example, the perforated acoustic structure 20 has a thickness between 0.5 and 2 millimeters, the peripheral partitions 102 have a thickness between 1 and 5 millimeters, or the peripheral partitions 102 have a thickness between 1 and 3 millimeters.

This relatively thin thickness is particularly desired in acoustic treatments.

The perforated acoustic structure 20 comprises a plurality of perforations 200 formed in a regular manner in the perforated acoustic structure 20.

In a form of the present disclosure not shown, the perforations 200 can be spaced apart by a variable distance in the axial direction A.

The term axial direction should be understood with respect to the circulation of the air flow as represented by the arrow A in FIG. 1.

As illustrated in FIG. 3, each perforation 200 of the perforated acoustic structure has a substantially rectangular shape with rounded tops. In the present example, each acoustic cell 100 comprises four perforations 200.

Figure 4:
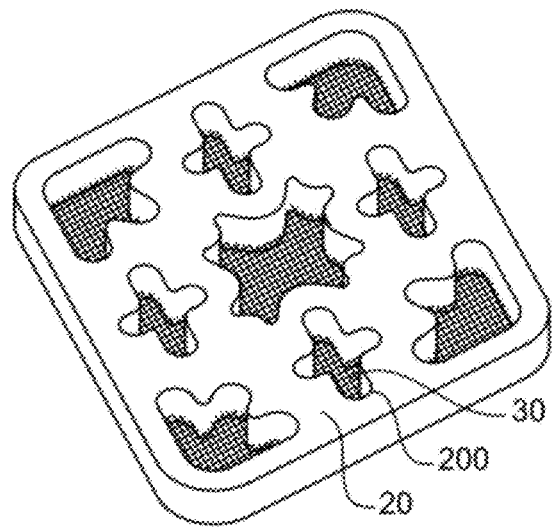
FIG. 4 is a partial perspective view of the acoustic attenuation panel according to another form of the present disclosure.

The present disclosure is not limited to this type of shape, indeed the shape of the perforations 200 can be variable and correspond to fractal shapes for example as illustrated in FIG. 4.

Figure 5:
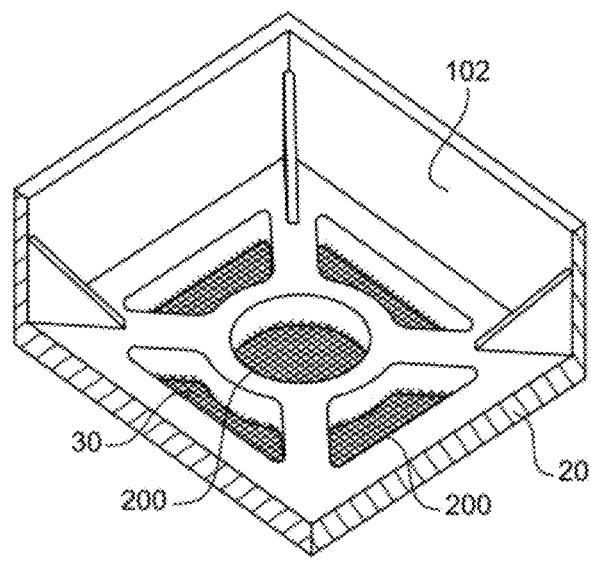
FIG. 5 is a partial perspective view of the acoustic attenuation panel according to yet another form of the present disclosure.

In a variant, the perforations 200 may have different shapes as illustrated in FIG. 5 in which at least one perforation 200 is circular in shape and at least one perforation is trapezoidal in shape.

In the same way, the dimension S of the perforations 200 can vary and be for example increasing along the axial direction A. This scalable distribution also makes it possible to provide larger dimensions S near the fan and smaller at the distal end of the latter to provide an acoustic treatment which is proportional to the sound level.

In one form of the present disclosure, the dimension of the perforations is at least 1 millimeter, and can be at least 2 millimeters.

The acoustic panel 1 has a porous acoustic layer 30. By porous layer it is meant a layer having at least one hole perforated by various mechanical means or a hole formed by the porosity of the material of the porous acoustic layer 30.

The porous acoustic layer 30 is arranged on the surface of the perforated acoustic structure 20 opposite the face of said structure 20 from which the peripheral partitions 102 extend. The porous acoustic layer 30 extends parallel to the perforated acoustic structure 20

Figure 2:
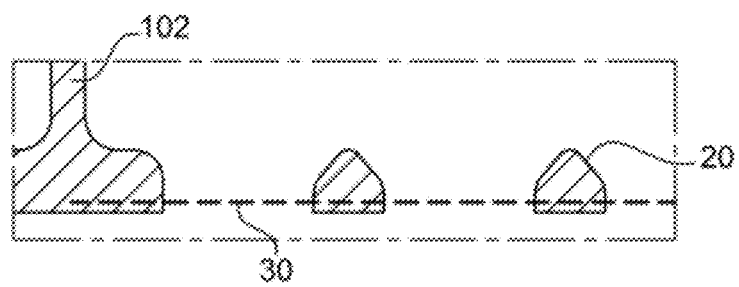
FIG. 2 is an enlarged view of the cross-sectional view of the acoustic attenuation panel according to the present disclosure.

The porous acoustic layer 30 is rigidly attached to the perforated acoustic structure 20 by entanglement of at least one of the materials with the second material. FIG. 2 illustrates in more detail the fixing between the porous acoustic layer 30 and the perforated acoustic structure 20. The porous acoustic layer 30 is fixed to the perforated acoustic structure 20 by an entanglement of the respective materials of the porous acoustic layer 30 and of the perforated acoustic structure.

By entanglement it is meant a diffusion of material into another material, a penetration of material to create bridges of material between the components.

This entanglement is obtained during the manufacture of the acoustic attenuation panel which is illustrated in FIG. 2.

Thus, it is possible to dispense with the techniques of fixing by bonding of the prior art which generate problems of holding and detachment over time, in particular in the case of porous layers of materials liable to corrode.

The porous acoustic layer 30 has holes 32 of dimensions smaller than the dimensions S of the perforations 200 of the perforated acoustic structure 20.

In a form of the present disclosure not shown, the dimension of the holes 32 of the porous acoustic layer 30 can vary and for example be increasing along the axial direction A.

According to one form of the present disclosure, the cellular structure 10, the perforated acoustic structure 20, and the porous acoustic layer 30 are made of identical materials.

According to a first example, the cellular structure 10, the perforated acoustic structure 20, and the porous acoustic layer 30 are made of metallic material, such as aluminum, more specifically an aluminum alloy selected from the 6000 series.

The porous acoustic layer 30 may be a micro-perforated metal sheet, for example by a micro-drilling technique produced by laser so as to form a layer similar to a mesh.

Alternatively, the porous acoustic layer 30 may be a very fine mesh of aluminum alloy of the same series or of a series of compatible alloy such as an alloy selected from the 5000 series.

According to a second example, the cellular structure 10, the perforated acoustic structure 20, and the porous acoustic layer 30 are made of composite material, for example of a material formed from a thermoplastic or thermosetting matrix.

According to another form of the present disclosure, the cellular structure 10, the perforated acoustic structure 20, and the porous acoustic layer 30 are made of different materials. For example, the cellular structure 10 and the perforated acoustic structure 20 are made of composite materials and the porous acoustic layer 30 is made of metallic material.

In another form, the acoustic attenuation panel 1 may comprise a removable cover (not shown) arranged on the face of the cellular structure opposite to the face comprising the perforated acoustic structure 20.

Figure 6:
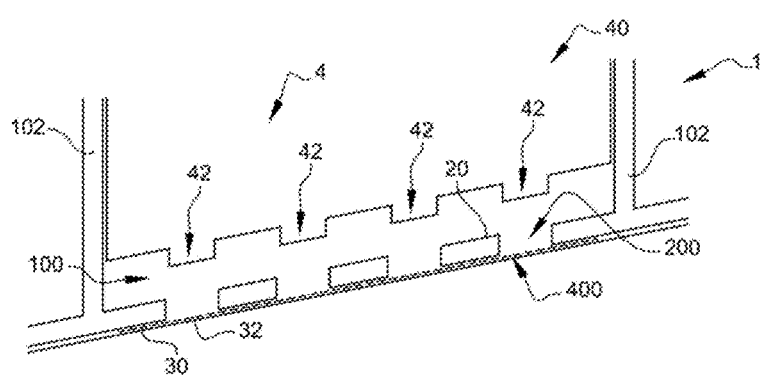
FIG. 6 is a schematic representation of a method for manufacturing an acoustic panel according to the present disclosure.

FIG. 6 is an illustration of a method for manufacturing the acoustic attenuation panel 1 according to one form of the present disclosure.

In the present example, the acoustic attenuation panel is produced by a molding tool 4 comprising a plurality of molds 40 and a counter-mold 400.

In the present example, each mold 40 has a shape intended to form an acoustic cell 100. Each mold comprises a plurality of punches 42 complementary to the perforations 200, intended to form an opening in the perforated acoustic structure 20. In the present example, a mold comprises four punches.

In a first form, a porous layer 30 is placed between the plurality of molds 40 and the counter-mold 400. As such, the molding tool 4 has a space located between the molds 40 and the counter-mold 400 corresponding to the thickness of the porous layer 30.

The porous layer 30 is pinched between the molds 40 and the counter-mold 400, for example by moving the mold 40 or by moving the counter-mold 400.

The material used to produce the perforated acoustic structure 20 and the cellular structure 10 in one part is injected into the molding tool 4 so that it infiltrates the parts of the mold located between two adjacent punches and fuses with or coats the material in the porous layer.

Thus, the porous acoustic layer 30 is fixed to the perforated acoustic structure 20 at the level of the parts P around the perforations 200.

The materials are then hardened, and the acoustic panel thus created is unmolded, for example by removing the molds 40 and then removing the acoustic panel created from the counter-mold 400.

In a first variant, the surfaces of the punches 42 and of the counter-mold 400 are coated with a flexible material such as silicone or fluorocarbon so that they are deformed to inhibit migration of material into the perforations 200 being formed. In addition, this soft coating makes it possible not to deform the porous acoustic layer during the pinching step.

In another variant, the surfaces of the punches 42 and of the counter-mold 400 can be made of a rigid material, the pinching of the porous layer causes deformation of the latter by work hardening. In a particular solution, the pinch is slightly more important in the zones of formation of the perforations 200 to inhibit migration of material.

In a second form, the perforated acoustic structure 20 and the cellular structure 10 formed in a single part are produced during a first operation using the molds 40 and the counter-mold 400 to form the acoustic cells 100 and an openwork of the perforated acoustic structure. The single part is hardened and then demolded.

The porous acoustic layer 30 is placed against the perforated acoustic structure 20.

The connection between the porous acoustic layer 30 and the perforated acoustic structure 20 is obtained by melting or partial dissolution either of the material of the single part formed of the perforated acoustic structure 20 and of the cellular structure 10, or of the porous layer 30, or both, so that the materials become entangled with each other. The fusion can be carried out by ultrasound, induction, Joule effect or by heating the molds 40 or the counter-mold 400.

In one form, the perforated acoustic structure 20 has irregularities, for example a micro-uneven surface, that is to say which is not smooth in order to improve the anchoring of the material of the porous layer 30 in the perforated acoustic structure 20.

The newly formed acoustic attenuation panel is cooled so as to form a mechanical and/or molecular bond between the components of the panel.

The present disclosure provides for reliably and effectively interposing the porous acoustic layer 30 on the perforated acoustic structure 20. The production of the perforations 200 of the acoustic panel 1 is improved and the dimension S of the perforations 200 is better controlled.

The acoustic attenuation panel 1 can be formed in a single, circular part, 360° corresponding to the dimensions of the nacelle or be sectorized into a plurality of panels that can be assembled, for example into twenty-four panels presenting a deformation at 15°. As such, the counter-mold 400 can have a concave or convex shape in the range of 15° so that the panel 1 has a desired degree of deformation. The arrangement in assembleable acoustic panels facilitates the replacement of a damaged panel in the nacelle.

The production of acoustic attenuation panels is not limited to the manufacturing methods as described previously and can for example be produced by additive manufacturing without using the molding tool.

This variation has the advantage of improving the design of the acoustic attenuation panel, in particular of the perforated acoustic structure in which perforations of complex shape can be made. Furthermore, the material surrounding the perforations may have a variable thickness or width, thus making it possible to provide acoustic structures with multiple scales of stiffness.

FIG. 7 is an illustration of a propulsion unit 5 extending along a longitudinal axis X comprising a short nacelle 50 and a turbojet engine 500. The nacelle 50 has a structure comprising an upstream section forming an air inlet 52, a middle section 54 comprising fan cowls intended to surround a fan 510 of the turbojet engine 500, a downstream section 56 comprising a thrust reverser and intended to surround the combustion chamber of the turbojet engine, and an exhaust nozzle 58.

The air inlet 52 comprises an inner face 53 facing the fan 510, said inner face receives at least one acoustic attenuation panel 1 according to the examples previously described.

As illustrated in FIG. 7, other components of the nacelle such as the thrust reverser for example, can receive the acoustic attenuation panel 1 according to the examples previously described.

The acoustic attenuation panel can find application in several locations of a nacelle such as an air inlet, an extended air inlet, at the level of a fan casing or even of a thrust reverser.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for manufacturing an acoustic attenuation panel by a molding tool comprising at least one mold and a counter-mold, the acoustic attenuation panel including a cellular structure comprising a plurality of acoustic cells separated from each other by peripheral partitions, a perforated acoustic structure, the perforated acoustic structure and the cellular structure being formed in a single part in a first material, and a porous acoustic layer formed of a second material, fixed to a surface of the perforated acoustic structure by entanglement of the first material and the second material, the method comprising:
    placing a porous acoustic layer in a space located between said at least one mold and the counter-mold;
    pinching the porous acoustic layer between said at least one mold and the counter-mold;
    injecting a material intended to form a perforated acoustic structure and a cellular structure in one piece in a molding tool;
    entangling the material intended to form a perforated acoustic structure and a cellular structure with the material of the porous acoustic layer; and
    removing the acoustic attenuation panel formed from the molding tool.

2. The method according to claim 1, wherein the single part formed from the cellular structure and the perforated acoustic structure and the porous acoustic layer comprise identical materials.

3. The method according to claim 1, wherein the single part formed from the cellular structure and the perforated acoustic structure and the porous acoustic layer comprise different materials.

4. The method according to claim 1, wherein the perforations of the perforated acoustic structure are spaced from each other by a variable distance in an axial direction.

5. The method according to claim 1, wherein the perforations of the perforated acoustic structure have an increasing dimension in an axial direction.

6. The method according to claim 1, wherein the perforations of the perforated acoustic structure comprise a rectangular shape.

7. The method according to claim 1, wherein the perforations of the perforated acoustic structure comprise at least 20% of the surface of said perforated acoustic structure.

8. The method according to claim 1, wherein the perforations of the perforated acoustic structure comprise at least 40% of the surface of said perforated acoustic structure.

9. The method according to claim 1, wherein the perforations of the perforated acoustic structure comprise at least 60% of the surface of said perforated acoustic structure.

10. The method according to claim 1, wherein the porous acoustic layer comprises holes of dimensions smaller than the dimensions of the perforations of the perforated acoustic structure.

11. The method according to claim 1, wherein the porous acoustic layer comprises holes of increasing size in an axial direction.

12. The method according to claim 1, wherein the perforated acoustic structure and the peripheral partitions comprise a thickness between 1 and 5 millimeters.

13. The method according to claim 1, wherein the perforated acoustic structure and the peripheral partitions comprise a thickness between 1 and 2 millimeters.

14. An air inlet of a nacelle, arranged upstream of a fan, the air inlet comprising an inner face facing the fan, said inner face receiving at least one acoustic attenuation panel manufactured according to the method of claim 1.

15. The method according to claim 1, wherein said at least one mold comprises at least one punch configured to form a perforation in the perforated acoustic structure.

16. The method according to claim 15, wherein surfaces of said at least one punch and of the counter-mold are coated with a flexible material.

17. The method according to claim 16, wherein the flexible material comprises at least one of silicone and fluorocarbon.

18. The method according to claim 15, wherein surfaces of the at least one punch and of the counter-mold comprise a rigid material.

* * * * *